US 9,571,561 B2

(12) United States Patent
Jang (10) Patent No.: US 9,571,561 B2
(45) Date of Patent: Feb. 14, 2017

(54) SYSTEM AND METHOD FOR DYNAMICALLY EXPANDING VIRTUAL CLUSTER AND RECORDING MEDIUM ON WHICH PROGRAM FOR EXECUTING THE METHOD IS RECORDED

(71) Applicant: SAMSUNG SDS Co., Ltd., Seoul (KR)

(72) Inventor: Sung Ho Jang, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 250 days.

(21) Appl. No.: 14/141,784

(22) Filed: Dec. 27, 2013

(65) Prior Publication Data
US 2014/0189109 A1 Jul. 3, 2014

(30) Foreign Application Priority Data
Dec. 28, 2012 (KR) .......................... 10-2012-0156929

(51) Int. Cl.
*H04L 29/08* (2006.01)
*G06F 9/50* (2006.01)

(52) U.S. Cl.
CPC ............ *H04L 67/10* (2013.01); *G06F 9/5077* (2013.01); *G06F 9/5083* (2013.01); *G06F 2209/5022* (2013.01)

(58) Field of Classification Search
CPC ...... H04L 67/10; G06F 9/5083; G06F 9/5077; G06F 2209/5022
See application file for complete search history.

(56) References Cited

U.S. PATENT DOCUMENTS 6,505,249 B1* 1/2003 Rehkopf ................. H04L 29/06
702/182
6,513,024 B1* 1/2003 Li ......................... G06N 99/005
706/13
(Continued)

FOREIGN PATENT DOCUMENTS

JP       2011-258119 A       12/2011
KR    1020070062607 A        6/2007
(Continued)

OTHER PUBLICATIONS

U.S. Appl. No. 14/127,946, Wuji Chen.*
(Continued)

*Primary Examiner* — Philip Chea
*Assistant Examiner* — Wuji Chen
(74) *Attorney, Agent, or Firm* — Sughrue Mion, PLLC (57) ABSTRACT

Provided are a system and method for dynamically expanding a virtual cluster having one or more virtual machines (VMs), based on the resource availability of the virtual cluster and the type of the virtual cluster. The system for dynamically expanding a virtual cluster having one or more virtual machines (VMs), the system comprising a monitor unit which measures resource availability of a target virtual cluster and provides the resource availability to an expansion control unit, the expansion control unit which determines whether to expand the target virtual cluster based on the resource availability and determines a type and number of VM instances to be additionally allocated to the target virtual cluster by reflecting the resource availability and a type of the target virtual cluster and a virtual cluster configuration unit which modifies profile information of the target virtual cluster such that the determined number of VM instances of the determined type by the expansion control unit can be additionally allocated to the target virtual cluster.

16 Claims, 9 Drawing Sheets

(56) References Cited

U.S. PATENT DOCUMENTS

| | | | | |
|---|---|---|---|---|
| 6,668,340 | B1* | 12/2003 | Baker | G06F 11/3688 714/26 |
| 8,065,676 | B1* | 11/2011 | Sahai | G06F 9/5077 709/226 |
| 8,924,352 | B1* | 12/2014 | Andruss | G06F 11/1461 707/640 |
| 2002/0138443 | A1* | 9/2002 | Schran | G06Q 20/382 705/64 |
| 2004/0044992 | A1* | 3/2004 | Muller | G06F 11/3684 717/124 |
| 2004/0044993 | A1* | 3/2004 | Muller | G06F 11/3684 717/124 |
| 2004/0128651 | A1* | 7/2004 | Lau | G06F 11/3664 717/124 |
| 2005/0015641 | A1* | 1/2005 | Alur | G06F 11/1458 714/2 |
| 2005/0021699 | A1 | 1/2005 | Kota et al. | |
| 2005/0289540 | A1* | 12/2005 | Nguyen | G06F 9/45558 718/1 |
| 2006/0212740 | A1 | 9/2006 | Jackson | |
| 2007/0067587 | A1* | 3/2007 | Rossi | G06F 11/1461 711/162 |
| 2007/0143827 | A1* | 6/2007 | Nicodemus | G06F 21/6218 726/2 |
| 2008/0059610 | A1* | 3/2008 | Lin | G06F 9/5061 709/220 |
| 2008/0086719 | A1* | 4/2008 | Clemenceau | G06F 9/44505 717/121 |
| 2008/0183309 | A1* | 7/2008 | Beers | G06F 9/4411 700/17 |
| 2009/0228883 | A1 | 9/2009 | Gebhart et al. | |
| 2010/0146514 | A1* | 6/2010 | Alexander | G06F 11/3688 718/104 |
| 2011/0066708 | A1* | 3/2011 | Schran | G06Q 20/382 709/221 |
| 2011/0225277 | A1* | 9/2011 | Freimuth | G06F 9/45558 709/223 |
| 2012/0117229 | A1 | 5/2012 | Van Biljon et al. | |
| 2012/0124576 | A1* | 5/2012 | Chiaramonte | G06F 9/5077 718/1 |
| 2013/0019242 | A1* | 1/2013 | Chen | H04L 41/145 718/1 |
| 2013/0035909 | A1* | 2/2013 | Douady | 714/37 |
| 2014/0058871 | A1* | 2/2014 | Marr | G06F 9/45533 705/26.1 |
| 2014/0279922 | A1* | 9/2014 | Kottomtharayil | G06F 9/505 703/2 |

FOREIGN PATENT DOCUMENTS

| | | |
|---|---|---|
| KR | 1020100073959 A | 7/2010 |
| KR | 1020120063662 A | 6/2012 |

OTHER PUBLICATIONS

International Search Report (PCT/ISA/210) dated Feb. 28, 2014 issued by the International Searching Authority in counterpart Application No. PCT/KR2013/011694.

Communication, Issued by the Korean Intellectual Property Office, Dated Jan. 9, 2015, in counterpart Korean Application No. 10-2012-0156929.

Communication dated Jul. 17, 2015, issued by the Korean Intellectual Property Office in counterpart Korean Application No. 10-2012-0156929.

* cited by examiner

SYSTEM AND METHOD FOR DYNAMICALLY EXPANDING VIRTUAL CLUSTER AND RECORDING MEDIUM ON WHICH PROGRAM FOR EXECUTING THE METHOD IS RECORDED

This application claims priority from Korean Patent Application No. 10-2012-0156929 filed on Dec. 28, 2012 in the Korean Intellectual Property Office, the disclosure of which is incorporated herein by reference in its entirety.

BACKGROUND OF THE INVENTION

1. Field of the Invention

The present invention relates to a method and system for dynamically expanding a virtual cluster and a recording medium on which a program for executing the method is recorded, and more particularly, to a method and system for dynamically expanding a virtual cluster based on the amount of resources used by the virtual cluster even without setting modification of the virtual cluster by a user of the virtual cluster, and a recording medium on which a program for executing the method is recorded.

2. Description of the Related Art

Hypervisor technology has made it possible to generate a plurality of virtual machines (VMs) in one physical server and thus provide a plurality of virtual servers. The hypervisor technology can be applied to, e.g., the field of cloud computing. For example, a cloud computing service user may establish a VM, which is allocated with resources that meet his or her needs, in a physical server device provided by a service operator, thereby saving the cost of operating a server. A hypervisor manages virtualized hardware resources and provisions a VM using some of the resources. Here, the phrase "provisioning the VM" may denote connecting resources allocated to the VM to a VM instance.

A cloud computing service provider may provide a user with a cloud computing service in units of VM instances. However, the cloud computing service provider may also provide the user with the cloud computing service in units of virtual clusters, each composed of a plurality of VM instances. In this case, the user can obtain the effect of operating a virtual server pool and can save management costs compared with when operating a physical server pool. In addition, the user of the virtual cluster can retain large-scale computing power compared with when using the cloud computing service in units of VMs. Therefore, the virtual cluster service is a cloud service suitable for processing the so-called "big data."

Solutions that provide a virtual cluster to a user in the form of a service are being provided. These solutions establish a virtual cluster (called "Hadoop cluster") that can collect and process large data using virtualized infrastructure resources and provide the virtual cluster to a user. The solutions can establish a virtual cluster according to a user's needs by utilizing VMs and cloud storage provided by cloud infrastructure. However, once the virtual cluster is established, it is impossible to control the size of the virtual cluster.

Even after a virtual cluster is established, some solutions can add and delete virtual server instances through manual modification of the setting of the virtual cluster by a user. However, when the amount of data or work that needs to be processed increases, the size of the virtual cluster is not automatically expanded. This reduces job processing speed or interrupts a job, thereby resulting in data loss or failing to meet the user's service expectations.

A virtualization-based resource management apparatus and method and a computing system for virtualization-based resource management are disclosed in Korea Patent Publication No. 2010-0073959. The above published patent discloses the resource management of not a virtual cluster but a single VM. In addition, information about VM monitoring is used merely to determine the scale of VM resources managed by a management VM by calculating a time cost based on network traffic of the management VM. Thus, this patent still fails to solve problems related to the dynamic expansion of a virtual cluster.

SUMMARY OF THE INVENTION

Aspects of the present invention provide a system for dynamically expanding a virtual cluster having one or more virtual machines (VMs), based on the resource availability of the virtual cluster and the type of the virtual cluster.

Aspects of the present invention also provide a method of dynamically expanding a virtual cluster, which is composed of a plurality of VMs, based on the resource availability of the virtual cluster and the type of the virtual cluster.

Aspects of the present invention also provide a computer-readable recording medium on which a computer program for providing a function of dynamically expanding a virtual cluster, which is composed of a plurality of VMs, based on the resource availability of the virtual cluster and the type of the virtual cluster is recorded.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided a system for dynamically expanding a virtual cluster having one or more virtual machines (VMs), the system comprising a monitor unit which measures resource availability of a target virtual cluster and provides the resource availability to an expansion control unit, the expansion control unit which determines whether to expand the target virtual cluster based on the resource availability and determines a type and number of VM instances to be additionally allocated to the target virtual cluster by reflecting the resource availability and a type of the target virtual cluster, and a virtual cluster configuration unit which modifies profile information of the target virtual cluster such that the determined number of VM instances of the determined type by the expansion control unit can be additionally allocated to the target virtual cluster.

According to an embodiment of the present invention, the monitor unit measures utilization rates of first through n-th resources in the target virtual cluster and measures the resource availability using the utilization rates of the first through n-th resources, wherein $U\_AVG = a1 \times (1-U\_1) + a2 \times (1-U\_2) + \ldots + an \times (1-U\_n)$, where $U\_AVG$ indicates the resource availability, $U\_1$ through $U\_n$ respectively indicate the utilization rates of the first through n-th resources, $a1+a2+\ldots+an=1$, and $a1, a2, a3, \ldots, an$ are weights for the first through n-th resources, respectively.

According to an embodiment of the present invention, the expansion control unit comprises a threshold adjustment module which automatically adjusts a threshold for the target virtual cluster by reflecting at least one of a number of VM instances included in the target virtual cluster, a ratio of the sum of access times to an active period of the target virtual cluster, and a ratio of a number of VM instances allocated to a total number of VM instances that can be provided by a server pool included in a virtual cluster service system, and an expansion determination module which compares the resource availability with the threshold and determines to expand the target virtual cluster when the resource availability is less than the threshold. In this case, the monitor unit can further measures the utilization rates of the first and second resources of the target virtual cluster and provides the measured utilization rates to the expansion control unit, and the expansion control unit further comprises a required resource amount calculation module which calculates an additionally required amount of the first resource and an additionally required amount of the second resource when the expansion determination modules determines to expand the target virtual cluster, wherein $ADD\_1=(TH-U\_AVG)\times(1-U\_1)\times(1+a)$, where ADD_1 indicates the additionally required amount of the first resource, TH indicates the threshold, and a is designated as a preset weight exceeding zero when the type of the target virtual cluster is a first resource-oriented type and is designated as zero when the type of the target virtual cluster is not the first resource-oriented type, and $ADD\_2=(TH-U\_AVG)\times(1-U\_2)\times(1+b)$, where ADD_2 indicates the additionally required amount of the second resource, TH indicates the threshold, and b is designated as a preset weight exceeding zero when the type of the target virtual cluster is a second resource-oriented type and is designated as zero when the type of the target virtual cluster is not the second resource-oriented type. In this case, the expansion control unit can further comprises a VM selection module which determines the type and number of VM instances that are to be additionally allocated such that the additionally required amount of the first resource and the additionally required amount of the second resource calculated by the required resource amount calculation module can be met, wherein the VM selection module determines the type and number of VM instances that are to be additionally allocated such that a minimum number of VM instances can be additionally allocated and that a maximum number of VM instances of a type corresponding to the type of the target virtual cluster can be additionally allocated.

According to another aspect of the present invention, there is provided a computer-readable recording medium on which a computer program for executing a function of dynamically expanding a virtual cluster having one or more VMs is recorded, wherein the function comprises measuring resource availability of a target virtual cluster, determining whether to expand the target virtual cluster based on the resource availability, and additionally allocating one or more VM instances to the target virtual cluster when it is determined to expand the target virtual cluster in the determining of whether to expand the target virtual cluster, wherein the additionally allocating of the VM instances comprises determining a type and number of VM instances that are to be additionally allocated by reflecting the resource availability and a type of the target virtual cluster, and additionally allocating the determined number of VM instances of the determined type to the target virtual cluster.

According to still another aspect of the present invention, there is provide a method of dynamically expanding a virtual cluster having one or more VMs, the method comprising measuring resource availability of a target virtual cluster by using a virtual cluster service system, determining whether to expand the target virtual cluster based on the resource availability by using the virtual cluster service system, and additionally allocating one or more VM instances to the target virtual cluster by using the virtual cluster service system when it is determined to expand the target virtual cluster in the determining of whether to expand the target virtual cluster, wherein the additionally allocating of the VM instances comprises determining a type and number of VM instances that are to be additionally allocated by reflecting the resource availability and a type of the target virtual cluster, and additionally allocating the determined number of VM instances of the determined type to the target virtual cluster.

According to an embodiment of the present invention, the measuring of the resource availability comprises measuring utilization rates of first through n-th resources in the target virtual cluster, and measuring the resource availability, wherein $U\_AVG=a1\times(1-U\_1)+a2\times(1-U\_2)+ \ldots +an\times(1-U\_n)$, where U_AVG indicates the resource availability, U_1 through U_n respectively indicate the utilization rates of the first through n-th resources, and $a1+a2+ \ldots +an=1$. In this case, a1, a2, a3, . . . , can be a weight set corresponding to the type of the target virtual cluster.

According to other embodiment of the present invention, the determining of whether to expand the target virtual cluster can comprise automatically adjusting a threshold for the target virtual cluster using the virtual cluster service system by reflecting at least one of a number of VM instances included in the target virtual cluster, a ratio of the sum of access times to an active period of the target virtual cluster, and a ratio of a number of VM instances allocated to a total number of VM instances that can be provided by a server pool included in the virtual cluster service system, and determining to expand the target virtual cluster when the measured resource availability is less than the automatically adjusted threshold. In this case, the automatically adjusting of the threshold can comprise increasing the threshold by reflecting a first weight in a preset base threshold when automatically adjusting the threshold by reflecting the number of VM instances included in the target virtual cluster, wherein the first weight is a value that increases as (VM_MAX−VM_USER)/(VM_MAX−VM_MIN) increases, where VM_MAX is a number of VMs in a virtual cluster having a largest number of VMs among virtual clusters serviced by the virtual cluster service system, VM_MIN is a number of VMs in a virtual cluster having a smallest number of VMs among the virtual clusters serviced by the virtual cluster service system, and VM_USER is a number of VMs included in the target virtual cluster. In other case, the automatically adjusting of the threshold can comprise increasing the threshold by reflecting a second weight in the preset base threshold when automatically adjusting the threshold by reflecting the ratio of the sum of the access times to the active period of the target virtual cluster, wherein the second weight is a value that increases as "the sum of the access times/the active period of the target virtual cluster" increases, where the sum of the access times is the sum of session connection times of a user account of the target virtual cluster to the virtual cluster service system, and the active period of the target virtual cluster is a period of time from the generation of the target virtual cluster to a present time. In still other case, the automatically adjusting of the threshold can comprise reducing the threshold by reflecting a third weight in the preset base threshold when automatically adjusting the threshold by reflecting the ratio of the number of VM instances allocated to the total number of VM instances that can be provided by the server pool included in the virtual cluster service system.

According to still other embodiment of the present invention, the measuring of the resource availability can comprise measuring the utilization rate of the first resource and the utilization rate of the second resource in the target virtual cluster and calculating the resource availability of the target virtual cluster using the utilization rate of the first resource and the utilization rate of the second resource, and the determining of the type and number of VM instances that are to be additionally allocated comprises calculating an additionally required amount of the first resource using the resource availability and the utilization of the first resource and then adjusting the additional required amount of the first resource by reflecting the weight for the first resource according to the type of the target virtual cluster, calculating an additionally required amount of the second resource using the resource availability and the utilization rate of the second resource and then adjusting the additionally required amount of the second resource by reflecting the weight for the second resource according to the type of the target virtual cluster, and determining the type and number of VM instances that are to be additionally allocated such that the additionally required amount of the first resource and the additionally required amount of the second resource can be met.

According to still other embodiment of the present invention, the determining of the type and number of VM instances that are to be additionally allocated can comprise calculating an additionally required amount of a resource using the resource availability, and determining the type and number of VM instances that are to be additionally allocated such that the additionally required amount of the resource can be met, wherein the type and number of VM instances that are to be additionally allocated are determined such that a minimum number of VM instances can be additionally allocated.

According to still other embodiment of the present invention, the determining of the type and number of the VM instances that are to be additionally allocated can comprise calculating an additionally required amount of a resource using the resource availability, and determining the type of VM instances that are to be additionally allocated to be a type corresponding to the type of the target virtual cluster, and determining the number of VM instances that are to be additionally allocated such that the additionally required amount of the resource can be met.

According to still other embodiment of the present invention, the determining of whether to expand the target virtual cluster can comprise periodically measuring resource availability, analyzing the statistical trend of the resource availability using the measured resource availability, predicting whether the resource availability will be less than the threshold after a predetermined number of periods based on the statistical trend of the resource availability, and determining to expand the target virtual cluster when it is predicted that the resource availability will be less than the threshold after the predetermined number of periods.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will filly convey the scope of the invention to those skilled in the art. The same reference numbers indicate the same components throughout the specification.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

Figure 1:
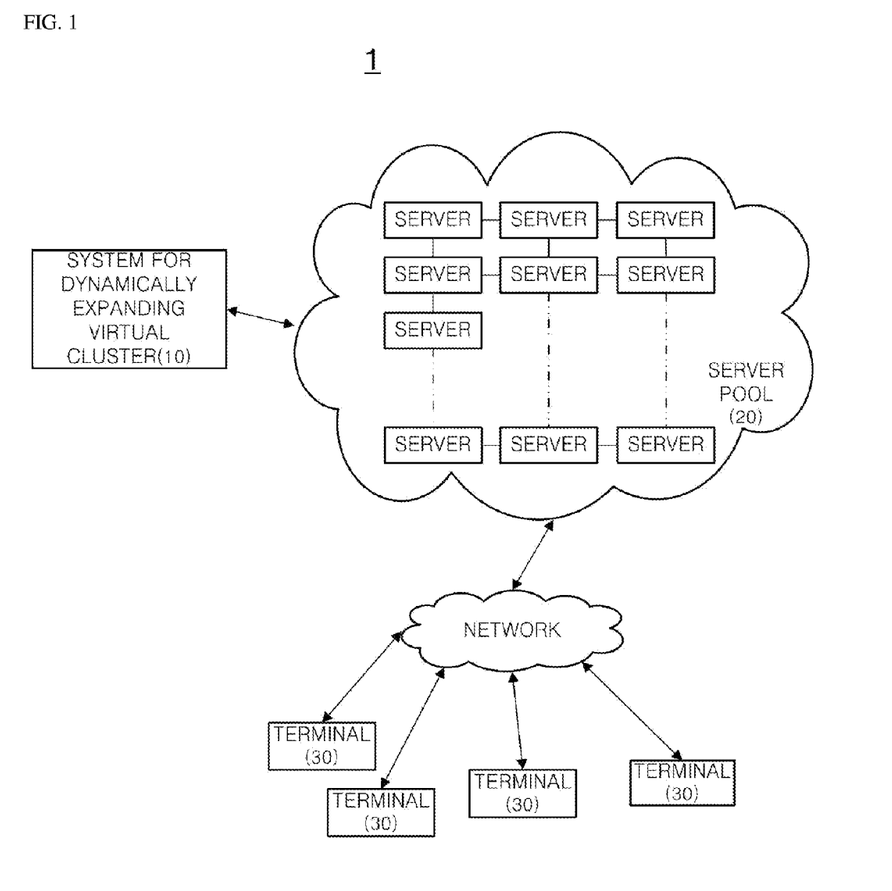
FIG. 1 is a diagram illustrating the configuration of a virtual cluster service system which includes a system for dynamically expanding a virtual cluster according to an embodiment of the present invention.

First, a virtual cluster service system will be described with reference to FIG. 1. A virtual cluster service system 1 of FIG. 1 includes a system 10 for dynamically expanding a virtual cluster according to an embodiment of the present invention.

The virtual cluster service system 1 provides a virtual cluster service using server resources included in a server pool 20 which includes a plurality of physical servers. As described above, the virtual cluster service is provided in units of virtual clusters, each composed of a plurality of virtual machine (VM) instances. Accordingly, a user of a virtual cluster can obtain the effect of operating a virtual server pool and can save management costs compared with when operating a physical server pool.

A user may access the server pool 20 through the network by using his or her terminal 30 and connect a session to his or her virtual cluster. Through the session, the user may perform jobs such as installation, setting modification and reconfiguration of programs to be executed on his or her virtual cluster.

The virtual cluster dynamic expanding system 10 for dynamically expanding a virtual cluster is connected to the server pool 20 and dynamically expands the size of each virtual cluster. Here, the time of expansion may be determined based on the resource availability of each virtual cluster. When the resource availability of a virtual cluster is less than a threshold, one or more VMs may be additionally allocated to the virtual cluster.

After a user of a virtual cluster confirms that the user will use a dynamic expansion function, the virtual cluster dynamic expanding system 10 for dynamically expanding a virtual cluster can expand the size of the virtual cluster by itself without manipulation of the user.

In the present invention, the phrase "expanding the size of the virtual cluster" denotes increasing virtual hardware resources allocated to the virtual cluster by additionally allocating one or more VMs to the virtual cluster.

Figure 2:
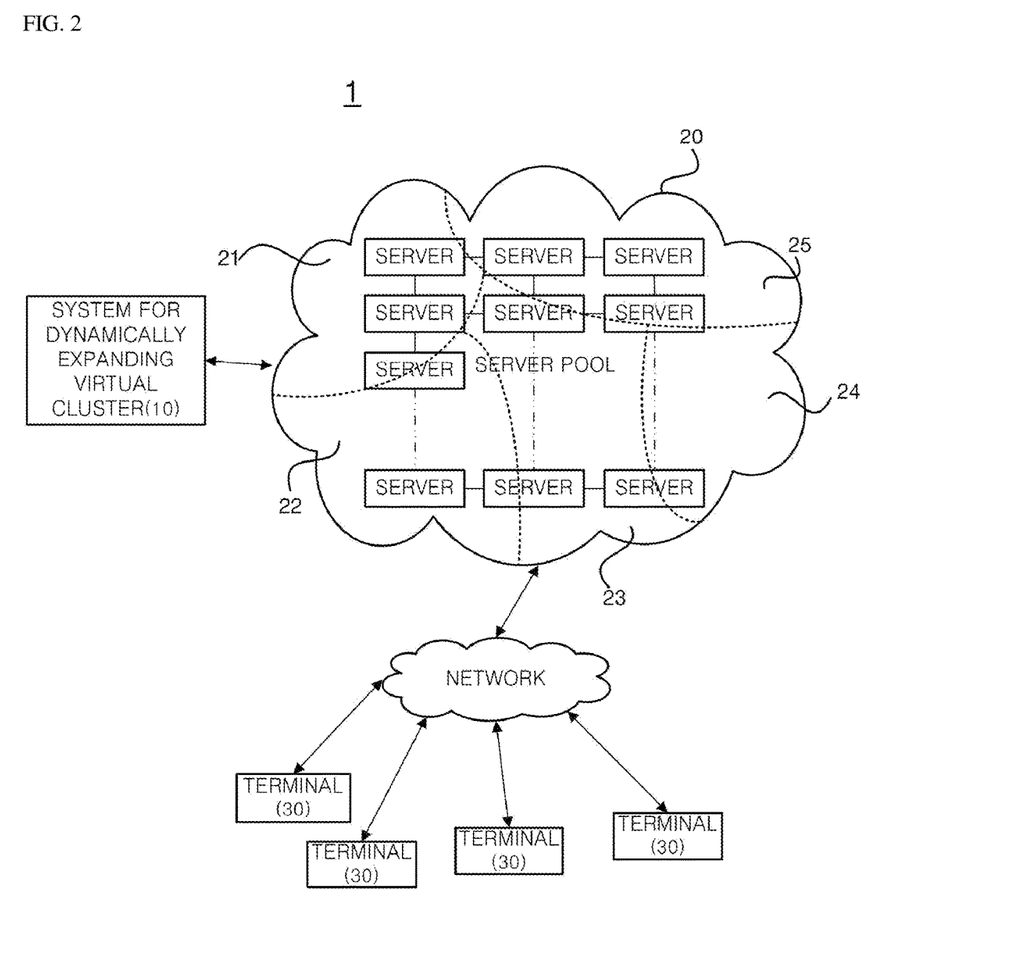
FIG. 2 is a diagram illustrating the concept of virtual clusters managed by the virtual cluster dynamic expanding system of FIG. 1.

FIG. 2 is a diagram illustrating the concept of virtual clusters managed by the virtual cluster dynamic expanding system 10 of FIG. 1. Referring to FIG. 2, five virtual clusters 21 through 25 may be provided using physical servers included in the server pool 20. In FIG. 2, one physical server belongs to two or more virtual clusters. This is because two or more VMs can be provisioned using hardware resources included in one physical server and can belong to different virtual clusters, as shown in FIG. 3.

Figure 3:
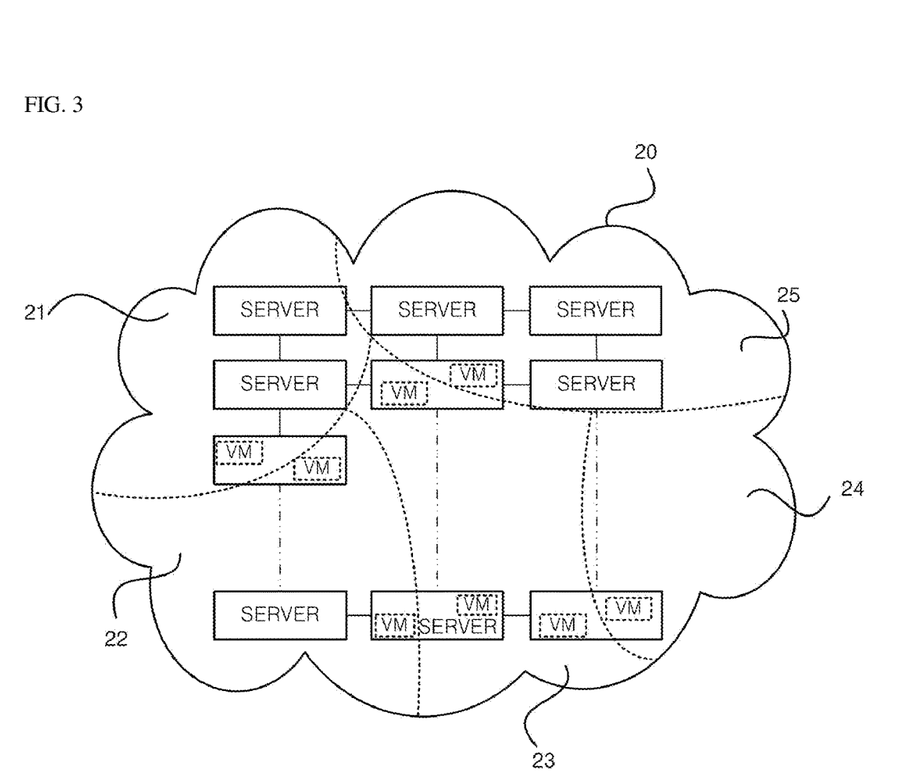
FIG. 3 is a diagram illustrating, in greater detail, the concept of the virtual clusters managed by the virtual cluster dynamic expanding system of FIG. 1.

That is, it can be understood from FIGS. 2 and 3 that each virtual cluster consists of a plurality of VMs and that the amount of entire system resources that can be used by one virtual cluster is determined by the amount of system resources allocated to each VM included in the virtual cluster or the number of VMs included in the virtual cluster.

Figure 4:
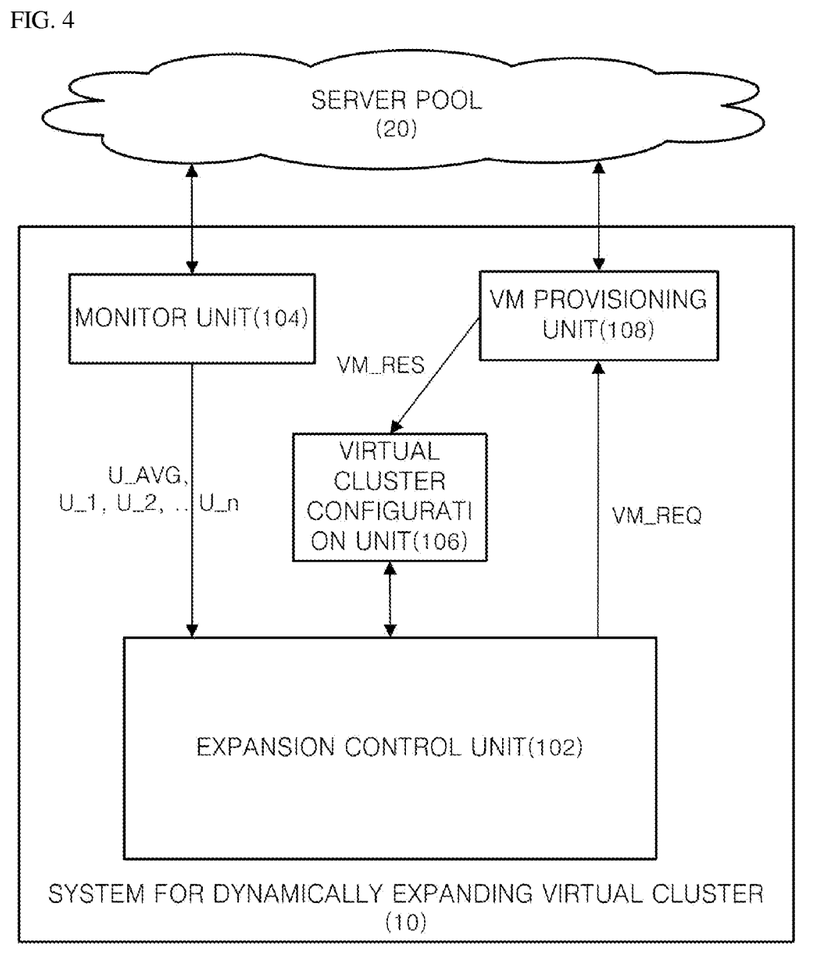
FIG. 4 is a block diagram of the virtual cluster dynamic expanding system shown in FIG. 1.
Figure 5:
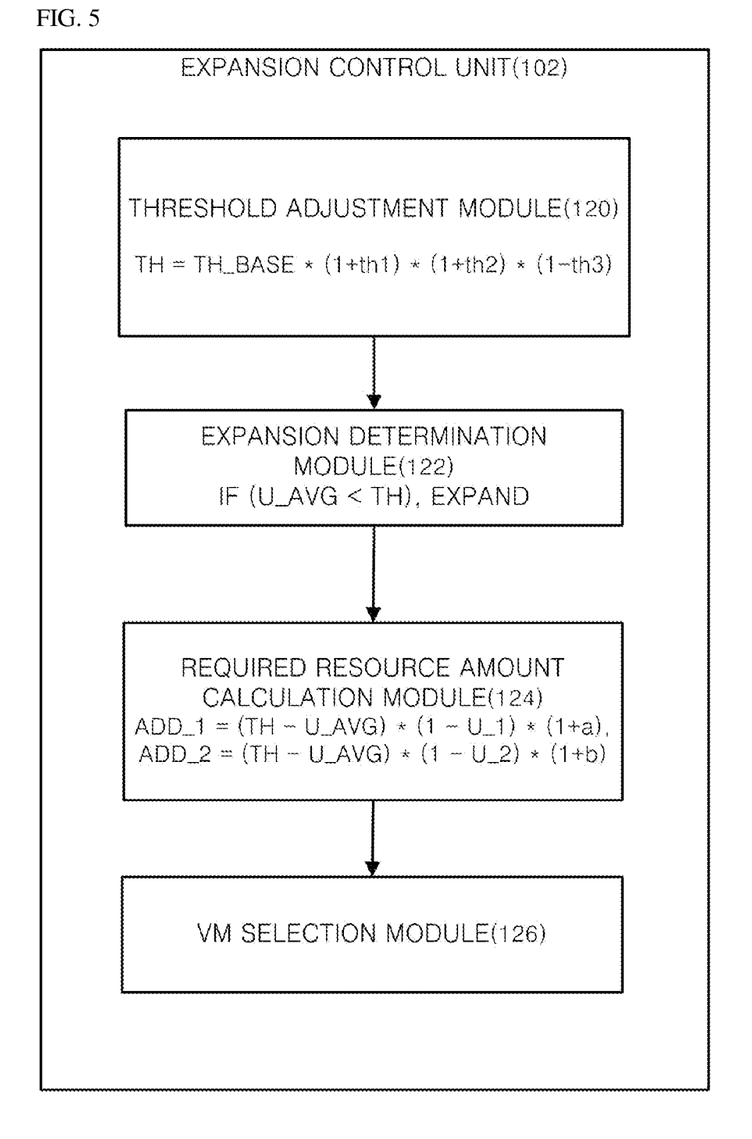
FIG. 5 is a detailed block diagram of some modules of the virtual cluster dynamic expanding system shown in FIG. 4.

The configuration and operation of the virtual cluster dynamic expanding system 10 shown in FIG. 1 will now be described with reference to FIGS. 4 and 5. FIG. 4 is a block diagram of the virtual cluster dynamic expanding system 10 shown in FIG. 1. Referring to FIG. 4, the virtual cluster dynamic expanding system 10 for dynamically expanding a virtual cluster according to the current embodiment may include an expansion control unit 102, a monitor unit 104, a virtual cluster configuration unit 106, and a VM provisioning unit 108.

The virtual cluster dynamic expanding system 10 connected to the server pool 20 calculates the amount of resources used by each of the virtual clusters 21 through 25 included in the server pool 20. In addition, the virtual cluster dynamic expanding system 10 calculates the resource availability of each of the virtual clusters 21 through 25 based on the amount of resources used.

The virtual cluster dynamic expanding system 10 determines whether to expand each of the virtual clusters 21 through 25 based on the resource availability of each of the virtual clusters 21 through 25. When determining to expand a virtual cluster, one or more VMs may be additionally allocated to the virtual cluster. In this case, the type and number of VM instances to be additionally allocated are determined by reflecting the type and resource availability of the virtual cluster.

The meaning of the "type of the virtual cluster" mentioned in the present invention will now be described. When requesting the generation of a virtual cluster, a virtual cluster user may designate the type of the virtual cluster. The type is related to characteristics of a program to be executed on the virtual cluster that is to be generated. For example, if the program to be executed mostly requires CPU operation, the type of the virtual cluster may be designated as a CPU-oriented type. If the program to be executed requires a lot of memory, the type of the virtual cluster may be designated as a memory-oriented type. If the program to be executed requires a lot of storage space, the type of the virtual cluster maybe designated as a storage-oriented type. That is, the type may indicate which hardware resource is reinforced by the virtual cluster that is to be generated.

If a "hardware resource is reinforced," the performance of the hardware resource may be much better than the performances of standard hardware components (that is, the other hardware resources). For example, a virtual cluster of a CPU resource-reinforced type may include VMs allocated with more virtual CPU cores than standard VM specifications. In addition, a virtual cluster of a storage resource-reinforced type may include VMs allocated with more virtual storage than standard VM specifications.

According to some embodiments, there may be a virtual cluster type that has reinforced two or more hardware resources. For example, there may be a virtual cluster type that has reinforced both CPU and memory resources, a virtual cluster type which has reinforced both CPU and storage resources, and a virtual cluster type which has reinforced both memory and storage resources.

For ease of description, an $n^{th}$ resource-reinforced type of a virtual cluster will hereinafter be referred to as an "$n^{th}$ resource-oriented type."

By reflecting the meaning of a virtual cluster type, the virtual cluster dynamic expanding system 10 for dynamically expanding a virtual cluster according to the current embodiment will understand on which system resource a virtual cluster is oriented when dynamically expanding the size of the virtual cluster based on the resource availability of the virtual cluster. The operation of each element of the virtual cluster dynamic expanding system 10 for dynamically expanding a virtual cluster according to the current embodiment will now be described. For ease of description, one virtual cluster to be monitored among all virtual clusters included in the server pool 20 will hereinafter be referred to as a "target virtual cluster" in order to distinguish the virtual cluster from the other virtual clusters.

The monitor unit 104 measures resource availability U_AVG of a target virtual cluster and provides the measured resource availability U_AVG to the expansion control unit 102. The resource availability U_AVG may be a percent value representing the total amount of available resources in the target virtual cluster.

The monitor unit 104 may measure a utilization rate (U_1, U_2, . . . , U_n) of each resource of the target virtual cluster in addition to the resource availability of the entire target virtual cluster and provide the measured utilization rate to the expansion control unit 102. In FIG. 4, a utilization rate of the $n^{th}$ resource is expressed as U_n. For example, a utilization rate of CPU may be U_1, a utilization rate of memory may be U_2, and a utilization rate of storage may be U_3.

The monitor unit 104 measures U_n as follows.

$$U\_n = \frac{\left(\sum_{i=1}^{\#VM} RESn\_i\right)}{\#VM},$$

where RESn_i indicates the utilization rate (%) of the $n^{th}$ resource of VM i, and #VM indicates the number of VMs included in the target virtual cluster. Therefore, U_n indicates an average utilization rate of the $n^{th}$ resource by each VM in the target virtual cluster.

The monitor unit 104 may measure the resource availability U_AVG based on U_n as follows.

$$U\_AVG = a1 \times (1-U\_1) + a2 \times (1-U\_2) + \ldots + an \times (1-U\_n),$$

where a1+a2+ ... +an=1.

Here, a1, a2, a3, ..., an are weights determined according to the type of a virtual cluster. That is, (a1, a2, a3, ..., an) is a weight set corresponding to the type of the target virtual cluster. For example, if the CPU utilization rate is U_1, the memory utilization rate is U_2, and the storage utilization rate is U_3, U_AVG=a1×(1−U_1)+a2×(1−U_2)+a3×(1−U_3). In this case, if the target virtual cluster is of the CPU-reinforced type, a1 may be greater than the other weights a2 and a3. If the target virtual cluster is of the memory-reinforced type, a2 may be greater than the other weights a1 and a3. If the target virtual cluster is of the storage-reinforced type, a3 may be greater than the other weights a1 and a2.

The expansion control unit 102 receives the measured resource availability U_AVG and determines whether to expand the target virtual cluster based on the resource availability U_AVG. When determining to expand the target virtual cluster, the expansion control unit 102 determines the type and number of VM instances that are to be additionally allocated to the target virtual cluster by reflecting the resource availability U_AVG and type of the target virtual cluster and controls the VM provisioning unit 108 to provision the determined number of VM instances of the determined type. In addition, the expansion control unit 102 controls the virtual cluster configuration unit 106 to additionally allocate the provisioned VM instances to the target virtual cluster.

The VM provisioning unit 108 is controlled by the expansion control unit 102 to provision a designated number of VM instances of a designated type according to the conventional art and provide information about the provisioned VM instances. The VM provisioning unit 108 checks available hardware resources in the server pool 20 in order to identify whether there are resources that can be allocated to a VM to be generated. If sufficient resources are available in the server pool 20, the VM provisioning unit 108 provisions the VM according to the conventional art.

The virtual cluster configuration unit 106 manages profile information of each virtual cluster included in the server pool 20. The profile information may at least include information about VM instances included in each virtual cluster. The profile information may further include information about the connection sequence of the VM instances included in each virtual cluster.

The virtual cluster configuration unit 106 is controlled by the expansion control unit 102 to modify the profile information of the target virtual cluster by referring to the information about the provisioned VM instances received from the VM provisioning unit 108, so that the provisioned VM instances can be additionally allocated to the target virtual cluster.

The detailed configuration of the expansion control unit 102 will now be described in greater detail with reference to FIG. 5. Referring to FIG. 5, the expansion control unit 102 may include a threshold adjustment module 120, an expansion determination module 122, a required resource amount calculation module 124, and a VM selection module 126.

The expansion determination module 122 compares the resource availability U_AVG received from the monitor unit 104 with a threshold TH and determines to expand the target virtual cluster when the resource availability U_AVG is less than the threshold TH.

The threshold adjustment module 120 automatically adjusts the threshold TH according to situation. The threshold adjustment module 120 automatically adjusts the threshold TH for the target virtual cluster by reflecting at least one of the number of VM instances included in the target virtual cluster, a ratio of the sum of access times to an active period of the target virtual cluster, and a ratio of the number of VM instances allocated (used) to the total number of VM instances.

The operation of the threshold adjustment module 120 will now be described in greater detail.

Initially, the threshold adjustment module 120 sets the threshold TH to a preset base threshold TH_BASE. The base threshold TH_BASE may be a value set by a system administrator.

The threshold adjustment module 120 may increase the threshold TH by reflecting a first weight th1 in the base threshold TH_BASE. The first weight th1 is a value that increases as (VM_MAX−VM_USER)/(VM_MAX−VM_MIN) increases. Here, VM_MAX is the number of VMs in a virtual cluster that includes a largest number of VMs among virtual clusters serviced by the virtual cluster service system, VM_MIN is the number of VMs in a virtual cluster that includes a smallest number of VMs among the virtual clusters serviced by the virtual cluster service system, and VM_USER is the number of VMs included in the target virtual cluster.

The threshold adjustment module 120 reflects the first weight th1 in the base threshold TH_BASE in order to promote fairness among service users by allocating more resources to a virtual cluster which includes a small number of VMs than to a virtual cluster which includes a large number of VMs.

The threshold adjustment module 120 may also increase the threshold TH by reflecting a second weight th2 in the base threshold TH_BASE. The second weight th2 is a value that increases as "the sum of access times/the active period of the target virtual cluster" increases. Here, the sum of access times is the sum of session connection times of a user account of the target virtual cluster to the virtual cluster service system, and the active period of the target virtual cluster is a period of time from the generation of the target virtual cluster to a present time.

The threshold adjustment module 120 reflects the second weight th2 in the base threshold TH_BASE in order to allocate more resources to a virtual cluster to which a user is connected for a longer time by considering the virtual cluster as an activated cluster.

The threshold adjustment module 120 may reduce the threshold TH by reflecting a third weight th3 in the base threshold TH_BASE. The third weight th3 reflects a ratio of the number of VM instances allocated (used) VM_USED to the total number of VM instances VM_TOTAL that can be provided by the server pool 20. The third weight th3 is proportional to "VM_USED/VM_TOTAL."

The threshold adjustment module 120 reflects the third weight th3 in the base threshold TH_BASE in order to prevent the depletion of resources in the server pool 20 by suppressing the expansion of a virtual cluster when there are not many resources left in the server pool 20.

The threshold adjustment module 120 may reflect one or more of the first through third weights th1 through th3 in the base threshold TH_BASE. For example, when reflecting all of the first through third weights th1 through th3, the threshold adjustment module 120 may automatically adjust the threshold TH as follows and as shown in FIG. 5.

$$TH = TH\_BASE \times (1+th1) \times (1+th2) \times (1-th3).$$

When the expansion determination module 122 determines to expand a virtual cluster, the required resource amount calculation module 124 calculates an additionally required amount ADD_1 of a first resource and an additionally required amount ADD_2 of a second resource. In addition to the additionally required amounts ADD_1 and ADD_2 of the first and second resources, additionally required amounts ADD_3, ADD_4, ..., ADD_n of third through $n^{th}$ resources may be calculated. Here, ADD_1=(TH−U_AVG)×(1−U_1)×(1+a), and ADD_2=(TH−U_AVG)×(1−U_2)×(1+b), where a may be designated as a preset weight exceeding zero only when the type of the target virtual cluster is a first resource-oriented type, and b may be designated as a preset weight exceeding zero only when the type of the target virtual cluster is a second resource-oriented type. Likewise, the additionally required amount ADD_3 of the third resource may be calculated by ADD_3=(TH−U_AVG)×(1−U_3)×(1+c), where c may be designated as a preset weight exceeding zero only when the type of the target virtual cluster is a third resource-oriented type.

The additionally required amount ADD_n of the $n^{th}$ resource may be calculated in units designated for each resource type. For example, CPU may use one core having a 1 GHz clock as one unit, memory may use 1 gigabyte (GB) as one unit, and storage may use 1 terabyte (TB) as one unit.

The VM selection module 126 determines the type and number of VM instances that are to be additionally allocated such that ADD_1, ADD_2, ADD_3, ..., ADD_n generated by the required resource amount calculation module 124 can be met.

Here, the VM selection module 126 may determine the type and number of VM instances that are to be additionally allocated such that a minimum number of VM instances can be additionally allocated.

TABLE 1

| VM instance type | CPU | Memory | Storage |
| --- | --- | --- | --- |
| CPU-oriented type | 4 CPUs × 4 cores × 2 GHz | 8 GB | 500 GB |
| Memory-oriented type | 2 CPUs × 2 cores × 2 GHz | 32 GB | 500 GB |
| Storage-oriented type | 2 CPUs × 2 cores × 2 GHz | 8 GB | 4 TB |

For example, in a case where VM instance types are provided as shown in Table 1 and where ADD_CPU (the additionally required amount of CPU) generated by the required resource amount calculation module 124 is 32 units, ADD_MEM (the additionally required amount of memory) generated by the required resource amount calculation module 124 is 8 units, and the additionally required amount of storage is 0.5 units, the VM selection module 126 can meet ADD_CPU by selecting the CPU-oriented type. For reference, CPU in the CPU-oriented type has 4×4×2=32 units.

The VM selection module 126 may also determine the type and number of VM instances that are to be additionally allocated such that a maximum number of VM instances of a type corresponding to the type of the target virtual cluster can be additionally allocated.

For example, when the type of the target virtual cluster is the CPU-oriented type, VM instances to be additionally allocated may also be of the CPU-oriented type. In this case, the VM selection module 126 additionally allocates the VM instances of the CPU-oriented type first. Then, when the CPU-oriented type VM instances can no longer be generated or when an exception occurs, for example, when ADD_CPU is fully met with the CPU-oriented type VM instances but other resources are still required, VM instances of types other than the CPU-oriented type may be additionally allocated.

A method of dynamically expanding a virtual cluster according to another embodiment of the present invention will hereinafter be described with reference to FIGS. 6 through 8. The method of dynamically expanding a virtual cluster according to the current embodiment may be performed by, but not necessarily, the virtual cluster dynamic expanding system 10.

The method of dynamically expanding a virtual cluster according to the current embodiment will now be described with reference to FIG. 6.

Figure 6:
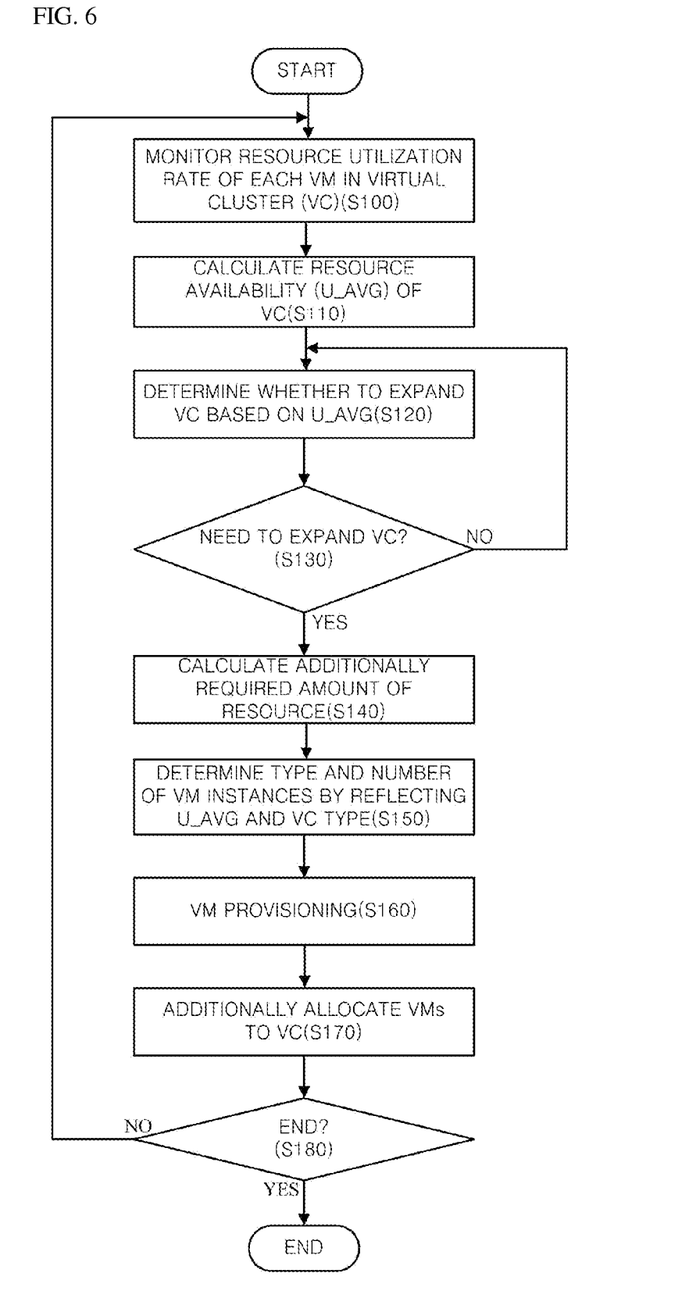
FIG. 6 is a flowchart illustrating a method of dynamically expanding a virtual cluster according to another embodiment of the present invention.

Referring to FIG. 6, a utilization rate U_n of each resource by each VM included in a target virtual cluster is monitored (operation S100). The resource utilization rate of each VM may be obtained from a hypervisor of each physical server included in a server pool 20.

Then, resource availability U_AVG of the target virtual cluster is calculated (operation S110). The calculating of the resource availability U_AVG may include measuring the utilization rate U_n of each resource in the target virtual cluster and then calculating the resource availability U_AVG by using the utilization rate U_n of each resource. Here, the utilization rate U_n of each resource may be assigned with a weight according to the type of the target virtual cluster. The resource availability U_AVG may be calculated as follows.

$$U\_AVG = a1 \times (1-U\_1) + a2 \times (1-U\_2) + \ldots + an \times (1-U\_n), \quad (1)$$

where a1+a2+ ... +an=1 (a1, a2, a3, ..., an are weights determined according to the type of a virtual cluster).

$$U\_n = \frac{\left(\sum_{i=1}^{\#VM} RESn\_i\right)}{\#VM}, \quad (2)$$

where RESn_i indicates the utilization rate (%) of an $n^{th}$ resource of VM i included in the target virtual cluster, and #VM indicates the number of VMs included in the target virtual cluster.

Next, whether to expand the target virtual cluster is determined based on the resource availability U_AVG (operation S120).

Figure 7:
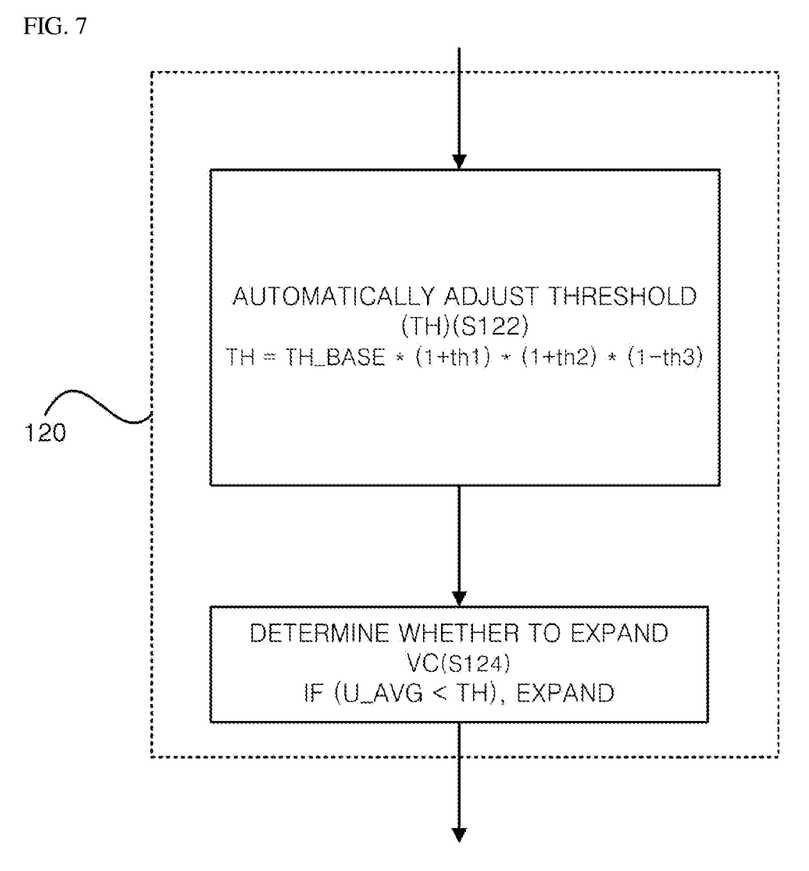
FIG. 7 is a detailed flowchart illustrating some operations of FIG. 6.

More specifically, referring to FIG. 7, a threshold TH is automatically adjusted by the virtual cluster dynamic expanding system 10 (operation S122). The threshold TH may be automatically adjusted by reflecting at least one of a first weight th1 which reflects the number of VM instances included in the target virtual cluster, a second weight th2 which reflects a ratio of the sum of access times to an active period of the target virtual cluster, and a third weight th3 which reflects a ratio of the number of VM instances allocated (used) to the total number of VM instances that can be provided by the server pool 20 included in a virtual cluster service system.

For example, after initially being set to a preset base threshold TH_BASE, the threshold TH may be increased by reflecting the first weight th1, increased again by reflecting the second weight th2, and reduced by reflecting the third weight th3.

When the resource availability U_AVG is less than the threshold TH, it is determined to expand the target virtual cluster (operation S124).

Referring back to FIG. 6, when it is determined that the target virtual cluster needs to be expanded, an additionally required amount of each hardware resource is calculated (operation S140). Basically, the additionally required amount of each hardware resource is calculated by multiplying a difference value between the threshold TH and the resource availability U_AVG by (1−the utilization rate of each resource). However, a weight corresponding to the type of the target virtual cluster can be additionally applied.

For example, an additionally required amount ADD_1 of a first resource and an additionally required amount ADD_2 of a second resource may be calculated using ADD_1=(TH−U_AVG)×(1−U_1)×(1+a) and ADD_2=(TH−U_AVG)×(1−U_2)×(1+b).

In this case, a may be designated as a preset weight exceeding zero only when the type of the target virtual cluster is a first resource-oriented type and may be designated as zero when the type of the target virtual cluster is not the first resource-oriented type. In addition, b may be designated as a preset weight exceeding zero only when the type of the target virtual cluster is a second resource-oriented type and may be designated as zero when the type of the target virtual cluster is not the second resource-oriented type.

The type and number of VM instances that need to be additionally allocated are determined by reflecting the resource availability U_AVG of the target virtual cluster and the type of the target virtual cluster (operation S150). Here, the type and number of VM instances to be additionally allocated are determined such that the additionally required amount of each hardware resource can be met. Preferably, the type and number of VM instances to be additionally allocated may be determined such that a minimum number of VM instances can be additionally allocated. According to an embodiment, the number of VM instances to be additionally allocated may be determined such that the additionally required amount can be met.

Next, VM instances to be additionally allocated are provisioned (operation S160), and the provisioned VM instances are additionally allocated to the target virtual cluster (operation S170). As a result, the target virtual cluster can use more system resources, which, in turn, increases the resource availability U_AVG of the target virtual cluster.

Figure 8:
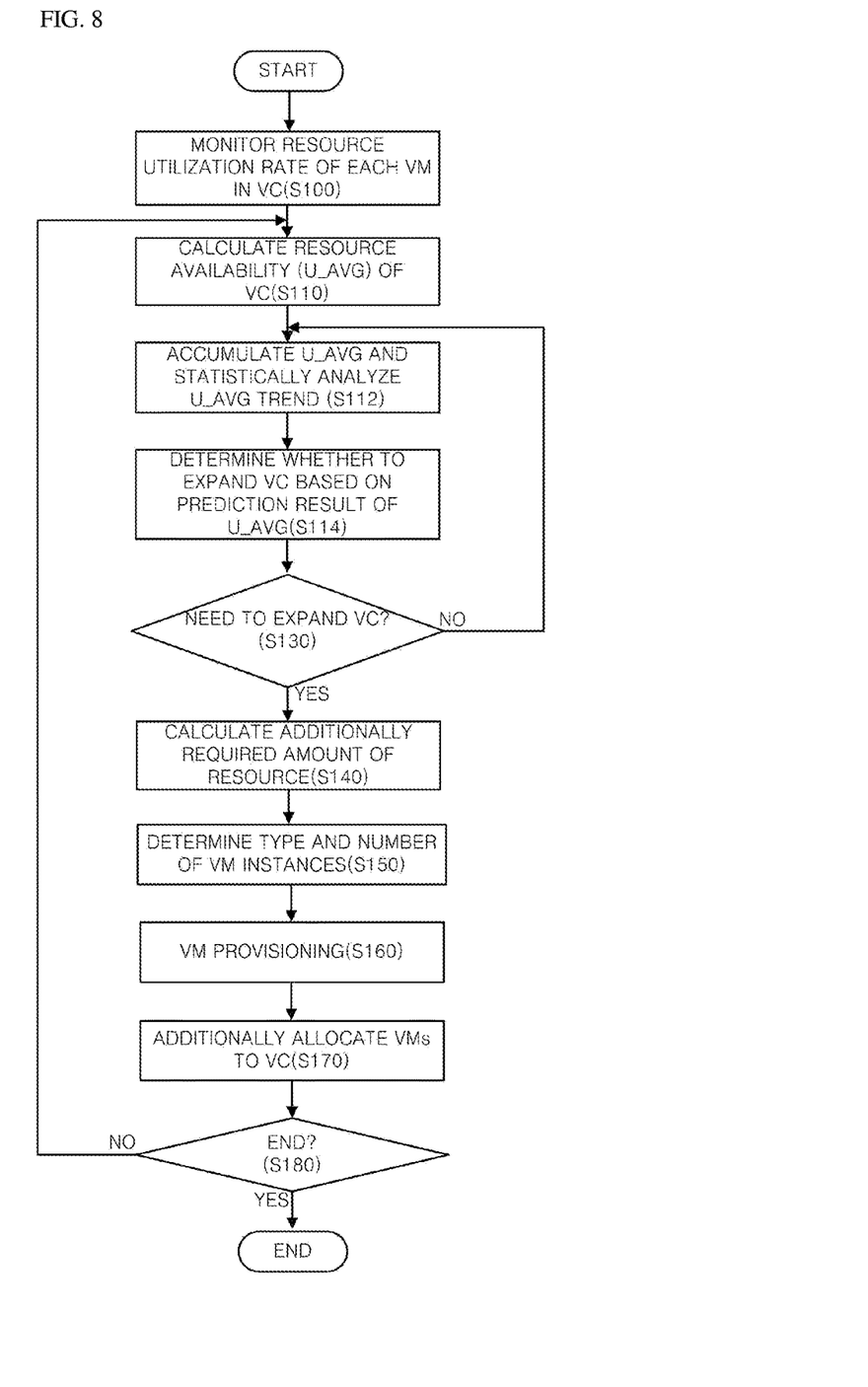
FIG. 8 is a flowchart illustrating a method of dynamically expanding a virtual cluster according to another embodiment of the present invention, the flowchart being different in at least some operations from the flowchart of FIG. 6.

FIG. 8 is a flowchart illustrating a method of dynamically expanding a virtual cluster according to another embodiment of the present invention, the flowchart being different in at least some operations from the flowchart of FIG. 6. According to the current embodiment, a resource availability value is calculated periodically (operation S110). The periodically calculated resource availability value is accumulated, and its trend is statistically analyzed (operation S112). Then, whether to expand a target virtual cluster is determined based on the prediction result of the resource availability value (operation S114).

Figure 9:
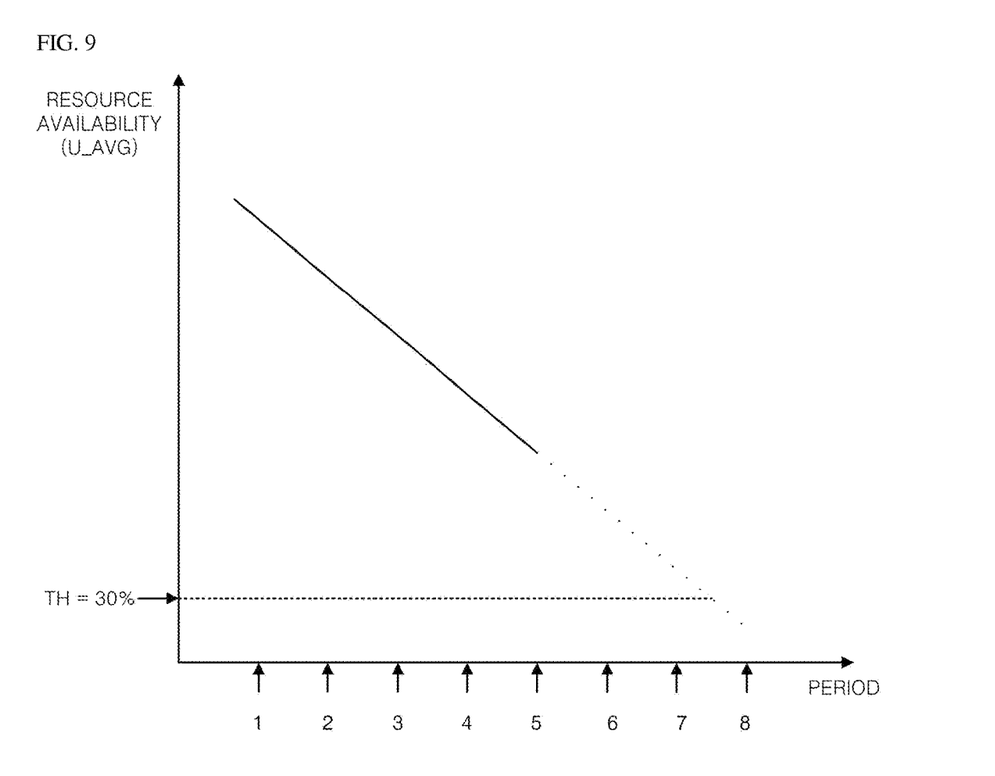
FIG. 9 is a conceptual diagram illustrating the dynamic expansion method of FIG. 8.

For example, the result of statistical analysis (operation S112) may indicate that the resource availability value of the target virtual cluster decreases linearly as shown in FIG. 9. If the latest measurement of the resource availability was taken in a fifth period, it can be predicted from the result of statistical analysis that the resource availability value will fall below 30% (i.e., a threshold) in at least an eighth period.

According to the current embodiment, the target virtual cluster can be expanded in advance to prevent the resource availability value from falling below the threshold.

According to the current embodiment, if it is predicted that the resource availability will fall below the threshold after a "predetermined number" of periods, the "predetermined number" may be set by a system administrator when it is determined to expand the target virtual cluster.

The present invention can also be embodied as computer readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (e.g., transmission through the Internet). The computer-readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A system for dynamically expanding a virtual cluster having one or more virtual machines (VMs), the system comprising:
   a monitor measures resource availability of a target virtual cluster; and
   a hardware processor configured to execute:
      an expansion controller which receives the measured resource availability, determines whether to expand the target virtual cluster based on the measured resource availability and determines a type and a number of VM instances to be additionally allocated to the target virtual cluster based on the measured resource availability and a type of the target virtual cluster; and
      a virtual cluster configurer which modifies profile information of the target virtual cluster such that the determined number of VM instances of the determined type can be additionally allocated to the target virtual cluster,
   wherein the type of the target virtual cluster indicates which hardware resource is reinforced by the target virtual cluster, and
   wherein the hardware resource is reinforced indicates performance of which hardware resource is better than performance of standard hardware resources, and
   wherein the monitor measures utilization rates of first through n-th resources in the target virtual cluster and measures the resource availability using the utilization rates of the first through n-th resources, wherein, $U\_AVG = a1 \times (1-U\_1) + a2 \times (1-U\_2) + \ldots + an \times (1-U\_n)$, where U_AVG indicates the resource availability, U_1 through U_n respectively indicate the utilization rates of the first through n-th resources, $a1+a2+\ldots+an=1$, and a1, a2, a3, ..., an are weights for the first through n-th resources, respectively.

2. The system of claim 1, wherein the expansion controller comprises:

a threshold adjustment module which automatically adjusts a threshold for the target virtual cluster based on at least one from among a number of VM instances in the target virtual cluster, a ratio of the sum of access times to an active period of the target virtual cluster, and a ratio of the number of VM instances allocated to a total number of VM instances that can be provided by a server pool in a virtual cluster service system; and an expansion determination module which compares the measured resource availability with the threshold and determines to expand the target virtual cluster when the measured resource availability is less than the threshold.

3. The system of claim 2, wherein the monitor further measures the utilization rates of a first resource and a second resource of the target virtual cluster and provides the measured utilization rates to the expansion controller, and the expansion controller further comprises a required resource amount calculation module which calculates an additionally required amount of the first resource and an additionally required amount of the second resource when the expansion determination module determines to expand the target virtual cluster, wherein $ADD\_1=(TH-U\_AVG)\times(1-U\_1)\times(1+a)$, where $ADD\_1$ indicates the additionally required amount of the first resource, TH indicates the threshold, and a is a preset weight exceeding zero when the type of the target virtual cluster is a first resource-oriented type and is zero when the type of the target virtual cluster is not the first resource-oriented type, and $ADD\_2=(TH-U\_AVG)\times(1-U\_2)\times(1+b)$, where $ADD\_2$ indicates the additionally required amount of the second resource, TH indicates the threshold, and b is a preset weight exceeding zero when the type of the target virtual cluster is a second resource-oriented type and is zero when the type of the target virtual cluster is not the second resource-oriented type.

4. The system of claim 3, wherein the expansion controller further comprises a VM selection module which determines the type and the number of VM instances that are to be additionally allocated such that the additionally required amount of the first resource and the additionally required amount of the second resource calculated by the required resource amount calculation module can be met, wherein the VM selection module determines the type and the number of VM instances that are to be additionally allocated such that a minimum number of VM instances can be additionally allocated and that a maximum number of VM instances of a type corresponding to the type of the target virtual cluster can be additionally allocated.

5. A method of dynamically expanding a virtual cluster having one or more VMs, the method comprising:

determining resource availability of a target virtual cluster by using a virtual cluster service system;

determining whether to expand the target virtual cluster based on the determined resource availability by using the virtual cluster service system; and additionally allocating one or more VM instances to the target virtual cluster by using the virtual cluster service system when it is determined to expand the target virtual cluster, wherein the additionally allocating of the VM instances comprises:

determining a type and a number of VM instances that are to be additionally allocated, based on the determined resource availability and a type of the target virtual cluster; and additionally allocating the determined number of VM instances of the determined type to the target virtual cluster, wherein the type of the target virtual cluster indicates which hardware resource is reinforced by the virtual cluster, wherein the hardware resource is reinforced indicates performance of which hardware resource is better than performance of standard hardware resources, and wherein the determining of the resource availability comprises:

measuring utilization rates of first through n-th resources in the target virtual cluster; and measuring the resource availability, wherein $U\_AVG=a1\times(1-U\_1)+a2\times(1-U\_2)+ \ldots +an\times(1-U\_n)$, where $U\_AVG$ indicates the resource availability, $U\_1$ through $U\_n$ respectively indicate the utilization rates of the first through n-th resources, and $a1+a2+ \ldots +an=1$.

6. The method of claim 5, wherein a1, a2, a3, . . . , an are a weight set corresponding to the type of the target virtual cluster.

7. The method of claim 5, wherein the determining of whether to expand the target virtual cluster comprises:

automatically adjusting a threshold for the target virtual cluster using the virtual cluster service system based on at least one from among a number of VM instances in the target virtual cluster, a ratio of the sum of access times to an active period of the target virtual cluster, and a ratio of the number of VM instances allocated to a total number of VM instances that can be provided by a server pool in the virtual cluster service system; and determining to expand the target virtual cluster when the determined resource availability is less than the automatically adjusted threshold.

8. The method of claim 7, wherein the automatically adjusting of the threshold comprises increasing the threshold based on a first weight in a preset base threshold when automatically adjusting the threshold based on the number of VM instances in the target virtual cluster, wherein the first weight is a value that increases as (VM_MAX−VM_USER)/(VM_MAX−VM_MIN) increases, where VM_MAX is a number of VMs in a virtual cluster having a largest number of VMs among virtual clusters serviced by the virtual cluster service system, VM_MIN is a number of VMs in a virtual cluster having a smallest number of VMs among the virtual clusters serviced by the virtual cluster service system, and VM_USER is a number of VMs in the target virtual cluster.

9. The method of claim 7, wherein the automatically adjusting of the threshold comprises increasing the threshold based on a second weight in the preset base threshold when automatically adjusting the threshold based on the ratio of the sum of the access times to the active period of the target virtual cluster, wherein the second weight is a value that increases as the sum of the access times divided by the active period of the target virtual cluster increases, where the sum of the access times is a sum of session connection times of a user account of the target virtual cluster to the virtual cluster service system, and the active period of the target virtual cluster is a period of time from a generation of the target virtual cluster to a present time.

10. The method of claim 7, wherein the automatically adjusting of the threshold comprises reducing the threshold by reflecting a third weight in the preset base threshold when automatically adjusting the threshold by reflecting the ratio of the number of VM instances allocated to the total number of VM instances that can be provided by the server pool in the virtual cluster service system.

11. The method of claim 5, wherein the determining of the resource availability comprises:

measuring the utilization rate of the first resource and the utilization rate of the second resource in the target virtual cluster and calculating the resource availability of the target virtual cluster using the utilization rate of the first resource and the utilization rate of the second resource, and the determining of the type and the number of VM instances that are to be additionally allocated comprises:

calculating an additionally required amount of the first resource using the resource availability and the utilization of the first resource and adjusting the additional required amount of the first resource based on a weight for the first resource according to the type of the target virtual cluster;

calculating an additionally required amount of the second resource using the resource availability and the utilization rate of the second resource and adjusting the additionally required amount of the second resource based on a weight for the second resource according to the type of the target virtual cluster; and determining the type and the number of VM instances that are to be additionally allocated such that the additionally required amount of the first resource and the additionally required amount of the second resource can be satisfied.

12. The method of claim 5, wherein the determining of the type and the number of VM instances that are to be additionally allocated comprises:

calculating an additionally required amount of a resource using the determined resource availability; and determining the type and the number of VM instances that are to be additionally allocated such that the additionally required amount of the resource can be met, wherein the type and the number of VM instances that are to be additionally allocated are determined such that a minimum number of VM instances can be additionally allocated.

13. The method of claim 5, wherein the determining of the type and the number of the VM instances that are to be additionally allocated comprises:

calculating an additionally required amount of a resource using the determined resource availability; and determining the type of VM instances that are to be additionally allocated to be a type corresponding to the type of the target virtual cluster; and determining the number of VM instances that are to be additionally allocated such that the additionally required amount of the resource can be met.

14. The method of claim 5, wherein the determining of whether to expand the target virtual cluster comprises:

periodically determining resource availabilities;

accumulating the periodically determined resource availabilities;

analyzing a trend of the accumulated resource availabilities;

predicting whether the determined resource availability will be less than the threshold after a predetermined number of periods based on the trend of the accumulated resource availabilities; and determining to expand the target virtual cluster when it is predicted that the determined resource availability will be less than the threshold after the predetermined number of periods.

15. The system of claim 1, wherein the type the target virtual cluster is selected from among a CPU-oriented type, a memory-oriented type, and a storage oriented type.

16. The system of claim 1, wherein the expansion controller determines the type and the number of the VM instances to be additionally allocated to the target virtual cluster, which is an existing cluster, by assigning different weights to different types of resources based on the type of the target virtual cluster that comprises a plurality of hardware resources.

* * * * *